United States Patent [19]

Slekys et al.

[11] Patent Number: *5,528,664

[45] Date of Patent: Jun. 18, 1996

[54] CELLULAR DATA OVERLAY SYSTEM PROVIDING PACKET-SWITCHED COMMUNICATION DATA SERVICE OVER A SELECTED CHANNEL WHICH IS NOT IN USE BY A CIRCUIT-SWITCHED COMMUNICATION SUBSYSTEM

[75] Inventors: Arunas G. Slekys; William A. Gage; William E. Andrietz; Duane Sharman, all of Calgary, Canada

[73] Assignee: Harris Canada Inc., Calgary, Canada

[*] Notice: The term of this patent shall not extend beyond the expiration date of Pat. No. 5,396,539.

[21] Appl. No.: 279,586

[22] Filed: Oct. 26, 1994

Related U.S. Application Data

[63] Continuation of Ser. No. 161,694, Dec. 3, 1993, Pat. No. 5,396,539, which is a continuation of Ser. No. 674,660, Mar. 25, 1991, abandoned.

[51] Int. Cl.$^6$ .............................. H04Q 7/28; H04Q 7/20; H04Q 7/38; H04Q 7/08
[52] U.S. Cl. .............................. 379/58; 370/8; 370/95.1; 379/57; 379/59
[58] Field of Search .............................. 370/8, 95.1, 94.2, 370/95.3; 379/57, 58, 59; 380/20

[56] References Cited

U.S. PATENT DOCUMENTS

| | | | |
|---|---|---|---|
| 3,824,597 | 7/1974 | Berg | 370/8 |
| 4,396,539 | 3/1995 | Slekys et al. | 379/59 |
| 5,121,391 | 6/1992 | Paneth et al. | 370/95.1 |
| 5,153,903 | 10/1992 | Eastmand et al. | 379/57 |
| 5,175,758 | 12/1992 | Levarto et al. | 379/57 |
| 5,282,238 | 1/1994 | Berland | 379/58 |
| 5,299,198 | 3/1994 | Kay et al. | 370/95.3 |
| 5,313,461 | 5/1994 | Akl et al. | 370/942 |
| 5,321,750 | 7/1994 | Nadar | 380/20 |

OTHER PUBLICATIONS

Donald, "Advanced Mobile Phone Service: The Cellular Concept", The Bell System Technical Journal, 1979.

Primary Examiner—Curtis Kuntz
Assistant Examiner—William Cumming
Attorney, Agent, or Firm—Cesari and McKenna

[57] ABSTRACT

A cellular telephone system includes a packet-switched digital data communication subsystem overlaying a circuit-switched (e.g., voice) communication subsystem, with voice and data services sharing the same voice channels. The voice communication subsystem provides voice services independently of the operation of the data communication subsystem. On the other hand, the data communication subsystem monitors use of the voice channels for voice communication, and, in response thereto, temporarily allocates one or more of the available voice channels for data service. In a preferred embodiment, each data basestation transmits, from time to time, an available-channel signature to identify those, if any, of the data-allocated channels that are not then being used to transmit voice or data. For data communication, a remote unit monitors selected voice channels in the coverage area of the cellular telephone system for available-channel signatures, selects one of the channels (if any) identified by the signature thereon as being available for data transmission, and transmits or receives digital information over that channel.

7 Claims, 8 Drawing Sheets

DATA BASE-STATION OPER.
REMOTE-TO-BASE
TRANSMISSION

FIG. 4

MOBILE UNIT OPERATION
BASE-TO-MOBILE DATA
TRANSMISSION

FIG. 5

DATA BASE-STATION OPERATION
BASE-TO-MOBILE DATA
TRANSMISSION

FIG. 6

FIG. 7

CELLULAR DATA OVERLAY SYSTEM PROVIDING PACKET-SWITCHED COMMUNICATION DATA SERVICE OVER A SELECTED CHANNEL WHICH IS NOT IN USE BY A CIRCUIT-SWITCHED COMMUNICATION SUBSYSTEM

This is a continuation application of Ser. No. 08/161,694 filed Dec. 3, 1993, now U.S. Pat. No. 5,396,539 which is a continuation application of Ser. No. 07/674,660 filed Mar. 5, 1991, and now abandoned.

FIELD OF THE INVENTION

This invention relates generally to telecommunication, and more particularly to data communication provided in conjunction with voice communication over radio channels of cellular telephone systems.

BACKGROUND OF THE INVENTION

A cellular telephone system provides radio communication between a stationary base system and remote units, e.g., mobile radio-telephones installed in automobiles. The base system typically includes a switching system, a network of geographically separated basestations, and other equipment. Each basestation defines a particular cell of the cellular system, and has at least one transceiver with the capability of calling to and receiving calls from remote units in the corresponding cell. Such a cellular telephone system is described in the Bell System Technical Journal, January 1979, entitled, "The Cellular Concept," page 15 et seq.

Cellular telephone systems are subject typically to governmental regulations and approvals, and must comply with standards, such as, for example, those set forth for the United States of America in EIA RS-553 by Electronic Industries Association, Washington, D.C., U.S.A.

A known cellular telephone system allocates to each basestation a plurality of radio channels to carry voice signals (called "voice channels"), and at least one separate signalling or control radio channel. In turn, the basestation assigns the allocated voice channels to remote units for use during voice telephone calls; the assignments of the voice channels being made in response to requests from the remote units for cellular service for the calls. This preliminary procedure of requesting and assigning a voice channel occurs over the control channel, and can be referred to as a "hand-shake" transaction. Hand-shake transactions occupy valuable time on the control channel.

Furthermore, because of the nature of cellular speech traffic, substantial voice channel capacity is sometimes idle, e.g., between telephone calls. This is even more pronounced during certain periods of the day, and during week-ends and holidays.

It has been proposed to provide data communication service in addition to voice service over cellular telephone systems. Two general alternatives exist in the prior art. In one approach, the cellular telephone system sends data as well as speech information over the voice channels, thereby purportedly improving radio channel utilization. One such system is described in U.S. Patent No. 4,887,265. Sharing channels with data in accordance with that approach, however, degrades voice service insofar as the data competes with voice traffic for channel utilization, and degrades overall system performance in that control channels are used to carry both data and voice communication requests.

A second approach avoids interference with voice services by establishing a separate cellular data system operating over data-only channels in frequency bands distinct from those of the voice system. One such system is described in U.S. Pat. No. 4,914,651. This approach, however, does not provide for efficient use of the frequency spectrum, and might be subject to new governmental regulation and approvals, and the promulgation of new standards for the cellular data system.

SUMMARY OF THE INVENTION

The invention resides in overlaying a packet-switched digital data communication subsystem on a circuit-switched (e.g., voice) communication subsystem of a cellular telephone system, with the respective data and voice services sharing the same voice channels. The voice communication subsystem provides voice services independently of the operation of the data communication subsystem.

On the other hand, the data communication subsystem (or data overlay system, as it can be called) monitors use of the voice channels for voice communication, and, in response thereto, temporarily allocates one or more of the available voice channels for data service. By subordinating data communication in this way, the data service can share the voice channels without interfering with voice service.

More specifically, the data communication subsystem has a data basestation in each cell in which data communication service is provided. The data basestation monitors usage of each data-allocated voice channel for voice communication by the voice basestation by analyzing, e.g., signal characteristics represented by voice-channel utilization signals obtained from the voice basestation or from the airwaves.

For example, the voice-channel utilization signal can be the radio-frequency output signals of the voice basestation, in which case the data basestation can examine, e.g., the transitions in the signal's radio-frequency power levels from substantially zero power (indicative of the absence of voice transmission) to a non-zero power level indicative of the presence of voice transmission.

Where the voice-channel utilization signal indicates an absence of voice communication on the associated voice channel, the data basestation transmits, from time to time, an available-channel signature to identify that data-allocated channel as available for data service. Preferably, the available-channel signature is a special signal broadcasted on the available data-allocated channels not then being used to transmit voice or data.

For data communication, a specially-equipped data remote unit monitors voice channels in the coverage area of the cellular telephone system for available-channel signatures, selects one of the channels (if any) identified by the signature thereon as being available for data communication, and transmits or receives digital information over that voice channel.

On initiation of a "voice" telephone call on that channel, however, any transmission (whether of data or a carrier signal) by the data overlay system over the channel abruptly terminates, preferably even though, e.g., the data transmission has not yet been completed. This prevents the data service from interfering with voice service provided by the cellular telephone system. If the data transmission is interrupted prior to completion of transmission of the data, the remote unit repeats the channel selection process, and continues data transmission on another voice channel.

Preferably, the remote unit maintains a list or look-up table stored in memory of the data-allocated channels associated with each cell. The look-up table can be static or, preferably, dynamic, with up-dates furnished (i.e., broadcasted) from time to time by the data basestations. Accordingly, during channel selection, in order to identify an available data-allocated channel, the remote unit can monitor only the more likely available voice channels identified by the updated data-allocated-channel list to find an available-channel signature, rather than, for example, all voice channels for the particular cell.

Accordingly, the invention improves channel utilization by sending data on voice channels. Moreover, the invention assigns a higher priority to voice service and accordingly controls data service by limiting channel access by the latter service to only those times when the channels are not being used for voice service. This approach avoids interference with primary voice service, yet it provides materially greater utilization of the overall channel capacity of the system by making use of otherwise inactive interludes in the voice channels.

Moreover, the invention eliminates hand-shaking over the separate control channels when data transmission is to take place, since a remote unit can "seize" and transmit data over an available data-allocated channel, and need not request and await assignment of a channel from the basestation prior to data transmission.

Advantageously, the data overlay system in accordance with the invention can usually be added to existing telephone cellular systems with no degradation of voice communication services, and with no modifications of existing voice basestations. In addition, the data overlay system can economically support a wide range of data communication applications with accurate and reliable transmission at a sufficiently high data through-put to accommodate the needs of a sizable number of concurrent users.

Finally, it is expected that the data overlay system in accordance with the invention can be implemented without requiring the promulgation of new standards.

BRIEF DESCRIPTION OF THE DRAWING

The above and further advantages of the invention may be better understood by referring to the following description in conjunction with the accompanying drawings, in which.

DETAILED DESCRIPTION OF ILLUSTRATIVE EMBODIMENT

Figure 1:
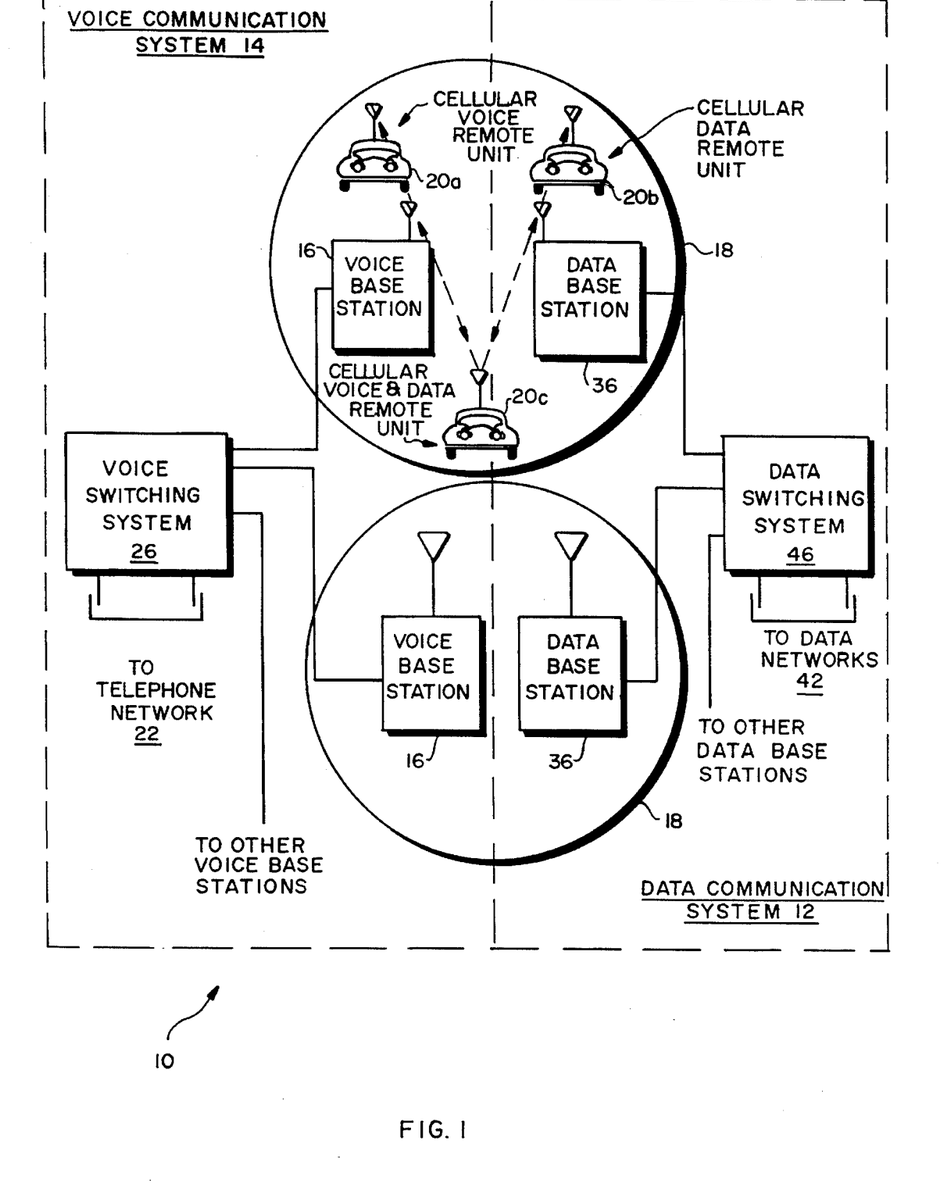
FIG. 1 is a block diagram of a cellular telephone system provided with a data overlay system in accordance with the invention.

FIG. 1 shows a cellular telephone system 10 including a data communication subsystem 12 overlaying a voice communication subsystem 14. The voice communication subsystem 14 has a plurality of voice basestations 16, each associated with a coverage area or cell 18 of the cellular telephone system 10.

Each voice basestation 16 provides voice communication services between one or more conventional voice remote units 20a, which are equipped for voice communication and present within its coverage area, and a conventional telephone network 22. A voice switching system 26 connected to the basestations 16 provides circuit switching for calls from the voice remote units 20a to the telephone network 22, and vice versa.

The data communication subsystem 12 has a plurality of data basestations 36, each associated with one of the cells 18 of the cellular telephone system 10. Each data basestation 36 can provide data communication services between data remote units 20b, which are equipped for data communication, when such remote units 20b are present with its coverage area and a conventional data or computer network 42. A data switching system 46 connected to the data basestations 36 provides packet switching for calls from the data remote units 20b to the data network 42, or vice versa.

For data transmission, the remote units 20b establish communications via selected basestations 36 serving the cells in which the remote units 20b are located. As the remote units 20b move from those cells 18 to others, communications with those selected basestations 36 are terminated, and the remote units 20b re-establish communications via other basestations 36.

The remote units 20a, 20b are depicted as mounted in automobiles, although other portable radio telephones, such as, for example, hand-held units and even non-portable wireless terminals (for example, security and control/monitoring units), fall within the scope of the invention.

In accordance with the invention, the data communication subsystem 12 (i) shares many of the same voice channels with the voice communication subsystem 14, and yet does not interfere with voice service of the cellular system 10, i.e., is transparent to users placing calls therein for voice communication, and (ii) can often be implemented in cells 18 having a voice basestations 16 already installed without requiring modification or retrofit of those voice basestations 16.

Figure 2:
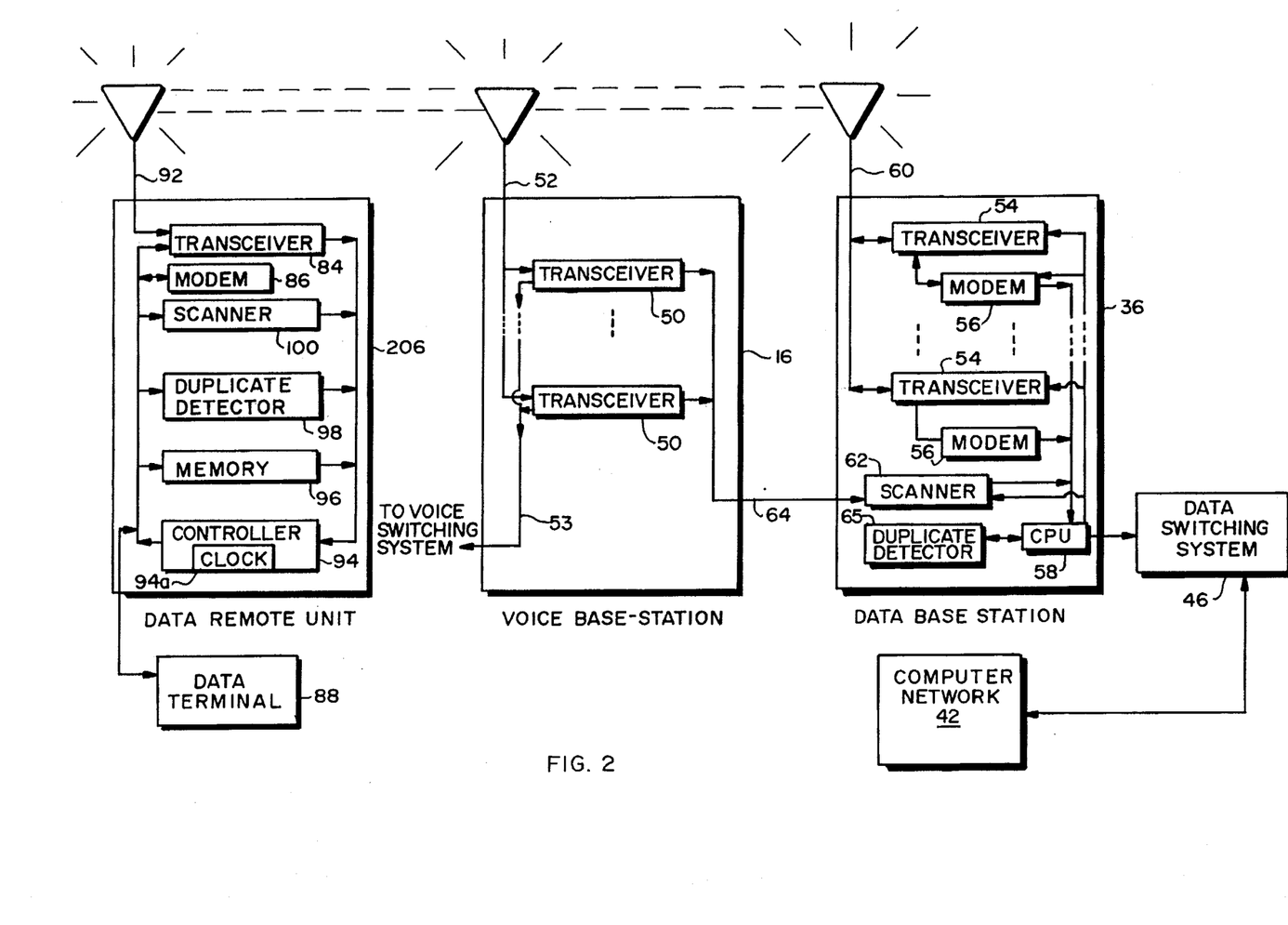
FIG. 2 is a detailed block diagram of the voice basestation, data basestation and data remote unit of FIG. 1.

FIG. 2 depicts the components of the cellular telephone system 10 associated with one of the cells 18. Specifically, the voice basestation 16 contains a number of conventional transceivers 50, each of which being tunable to a particular voice channel, and capable of duplex operation via antenna 52 for voice communication over that channel in accordance with cellular telephone standards. The voice basestation 16 also contains audio lines 53 for connecting the transceivers 50 to the voice switching system 26 (FIG. 1), and thence to an existing land line telephone network 22 for voice service. The voice basestation 16 also can include other conventional components, which need not be described herein since they are not involved in the present invention.

The data basestation 36 includes a number of transceivers 54, each of which being tunable to communicate over an assigned voice channel and capable of duplex operation via antenna 60 for data communication over that channel. The transceivers 54 are each connected by a modem 56 to a central processing unit ("CPU") 58. The CPU 58 is connected to the data switching system 46 and, thereby, to the data network 42.

The basestation 36 receives a radio frequency signal containing digital data over one of the allocated voice channels. The particular transceiver 54 that is tuned to that voice channel converts the received signal into a baseband signal. The modem 56 coupled with that transceiver 54 demodulates the baseband signal to recover the data contained therein. The data is provided to the CPU 58.

Similarly, for transmission of data, the CPU 58 of the basestation 36 receives the data via the switching system 46 from the data network 42, or generates control or status data, and, in either case, applies the data to one of the modems 56 for modulation thereof in accordance with any suitable modulation scheme, thereby generating a baseband signal. The transceiver 54 coupled to that modem 56 modulates a carrier signal with the baseband signal, and transmits the resulting modulated radio-frequency signal via the antenna 60. The CPU 58 controls the operation of the transceiver 54 and modem 56.

The data basestation 36 also employs a scanner 62, which receives a voice-channel-utilization signal over line 64 from each of the transceivers 50 of the voice basestation 16. That signal indicates whether the voice channels associated with the transceivers 50 of the voice basestation 16 are being used for voice communication.

For example, the voice-channel-utilization signal can designate the initiation and termination of voice telephone calls over the voice channel by representing the power levels or transitions, spectra, or other indicia of voice transmission from the transceiver 50.

More specifically, the voice-channel utilization signal can indicate the use of the voice channel by representing radio-frequency ("RF") power levels or transitions between power levels in an output of the voice basestation 16, or by representing control signals used within the voice basestation 16, such as those used to control the variable-gain amplifiers typically found in the terminal stages of transmitters transceivers 50 thereof.

Another technique is to obtain and demodulate the voice basestation RF output signals, and check for the presence of certain control information (e.g., supervisory audio tones) typically included therein in accordance with the aforementioned standards and indicative of voice communication.

Many commercially available voice basestations have external ports which permit access to one or another of these signals, in which case, the voice basestations need not be modified to provide the aforementioned voice-channel utilization signals to the data basestations.

Alternatively, rather than receiving the voice-channel-utilization signal over line 64, the scanner 62 of the data basestation 36 can instead intercept broadcasted voice communication signals on the voice channels, and use, e.g., the RF power levels or signal spectra or contents of the intercepted signals as the voice-channel utilization signals. Such non-intrusive approaches obviously require neither modification of the voice basestations, nor access to signals within the voice basestations.

The data basestation 36 also has a duplicate detector 65, which determines whether a received data packet is a duplicate of a previously received packet. The duplicate detector 65 can be implemented as a separate device, or can be implemented as a software routine within the CPU 58.

Figure 2A:
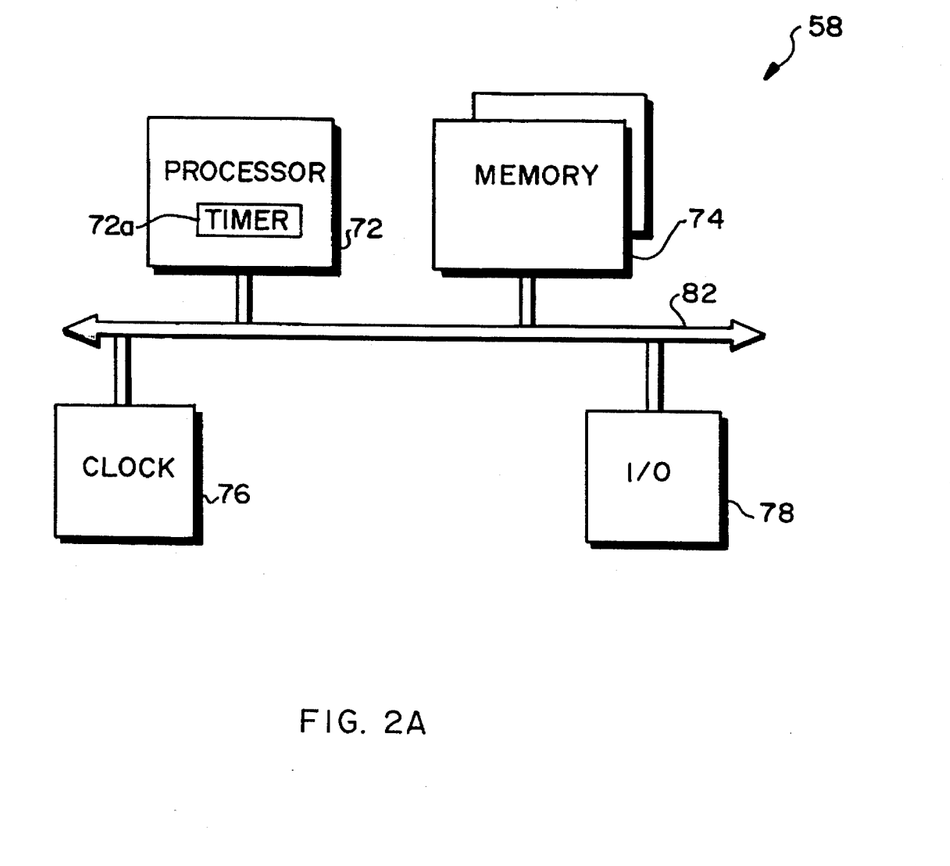
FIG. 2a is a detailed block diagram of the central processing unit 58 of the data basestation of FIG. 2.

FIG. 2a shows the components of CPU 58. CPU 58 has a processor 72, memory 74, clock or timing circuit 76 and one or more input/output ("I/O") devices 78. These components 72 through 78 are interconnected by a bus 82, and, along with other conventional components, can be implemented, for example, in a single integrated circuit. Where the duplicate detector routine is resident within the CPU 58, the routine can be stored in memory 74, and run by processor 72.

Returning to FIG. 2, the data remote unit 20b is a radio-telephone equipped for data communication. The data remote unit 20b includes a transceiver 84, which is tunable to communicate over any of a plurality of voice channels, and an antenna 92 capable of duplex communication in accordance with cellular telephone standards. The transceiver 84 is connected via a modem 86 to a conventional data terminal 88, e.g., a portable or other computer.

For data transmission from the data remote unit 20b, a controller 94 passes the data to the modem 86, at which the data is modulated pursuant the same modulation scheme used by the data basestation 36. The modem 86 provides the modulated data to the transceiver 84, which mixes the modulated data with a radio-frequency carrier for transmission via the antenna 92 over a voice channel. The transmitted data can be control or status data generated by the controller 94, or message data generated by the data terminal 88. The controller 94 controls operation of the other components of the data remote unit 20b in accordance with a routine stored in a memory 96.

On the other hand, when the remote unit 20b receives a broadcast data signal over a voice channel, the transceiver 84 converts the received signal into a baseband signal. The modem 86 then demodulates the baseband signal so as to form data packets, which are then passed to the controller 94. The received data packets can be control or status packets for use by the controller 94, or can be message packets, which are routed by the controller 94 to the data terminal 88. A duplicate detector 98 ascertains whether the received data packets are duplicates of ones previously received.

The data remote unit 20b further contains a scanner 100, which is used during channel selection as described hereinafter by causing the transceiver 84 to tune to a plurality of channels to identify available channels allocated for data communication. The purpose and operation of the scanner 100, as well as the procedure for selection of voice channels for data communication, will be described in greater detail hereinbelow.

An illustrative embodiment of the operation of the data remote unit 20b and the data basestation 36 will be described next. It should be understood at the outset that the operation of the data remote unit 20b is controlled preferably by a program stored in memory 96 and executed by controller 94. Likewise, the operation of the data basestation 36 is controlled preferably by a program stored and executed by the CPU 58.

Remote-To-Base Data Transmission

Figure 3:
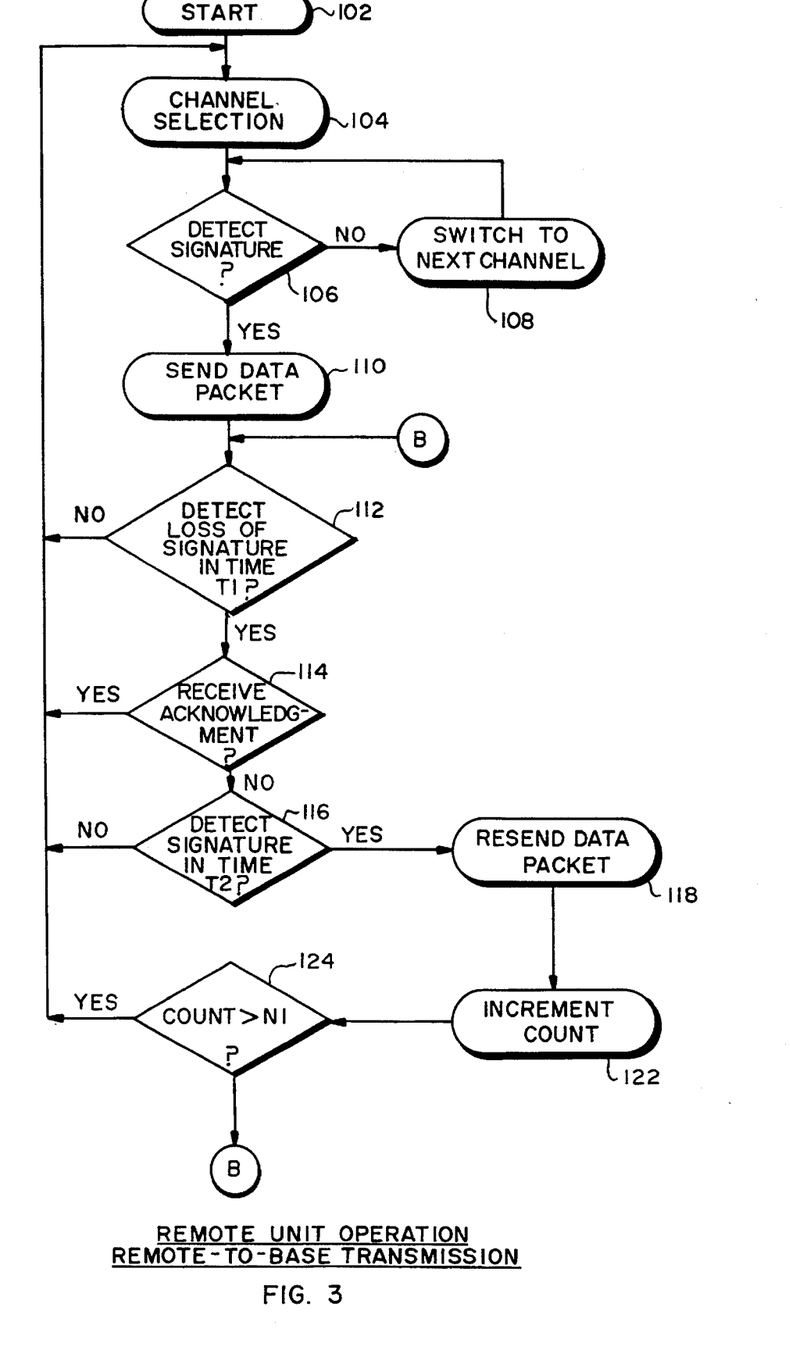
FIGS. 3 and 4 are flowcharts depicting the respective operation of the data remote unit and the data basestation shown in FIG. 2 during remote-unit-to-basestation transmission of data packets.
Figures 4, 4A:
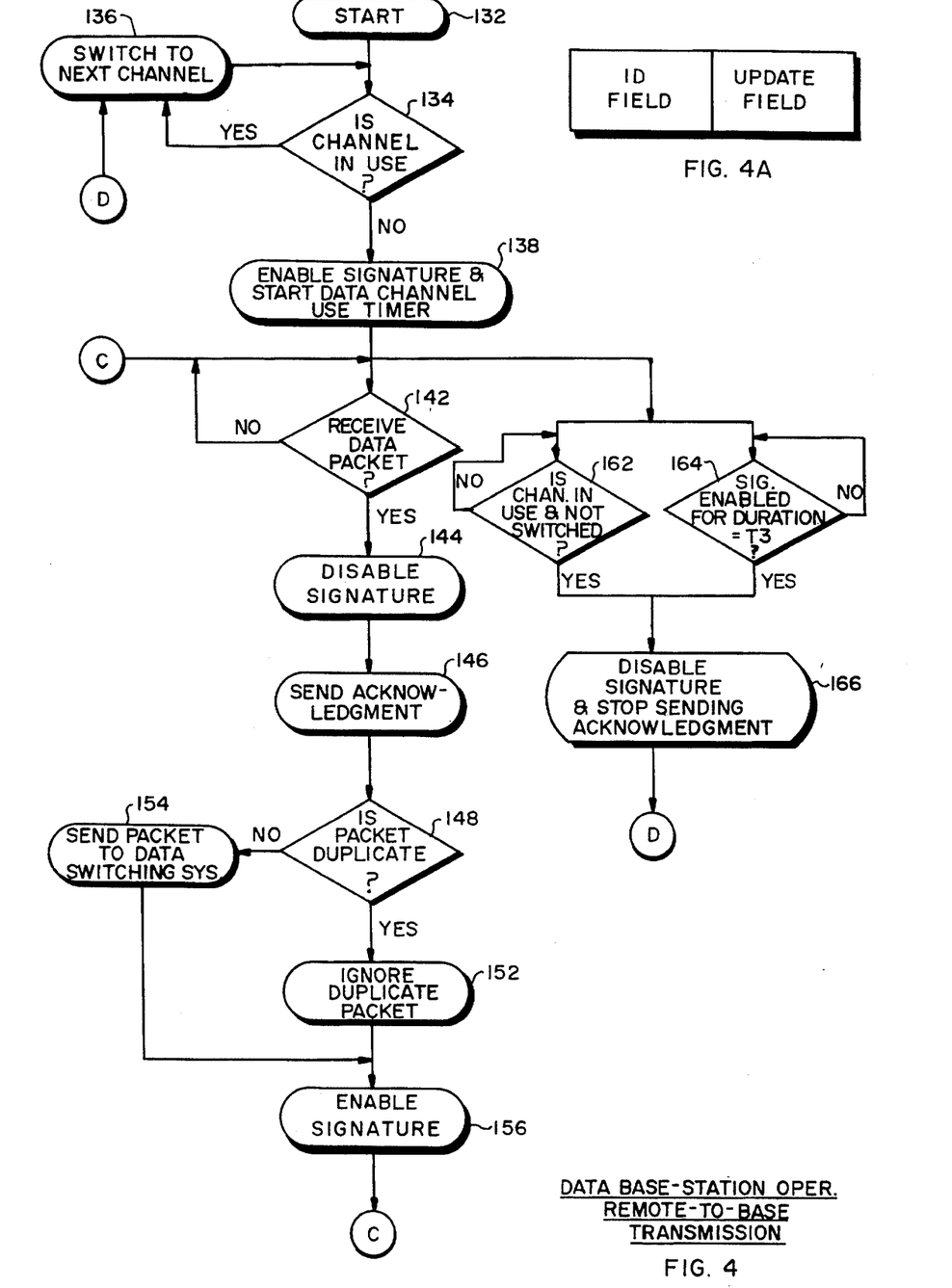
FIG. 4a is a block diagram of an available-channel signature.

FIGS. 3 and 4 show respective data remote unit and data basestation operation during remote-to-base transmission of data in accordance with an illustrative embodiment of the invention. In FIG. 3, in start block 102, the remote unit 20b performs, e.g., self-diagnostic tests. Then, for data communication, in block 104, the remote unit 20b performs channel selection.

For channel selection, the remote unit 20b determines which of the control channels of all voice basestations 16 in the cellular telephone system 10 carries the strongest signal, and then identifies the voice channels associated with that control channel. This process assures that, as the remote unit 20b moves relative to the various cells 18, data transmission will occur with data basestations 36 and over voice channels that can carry an adequately strong signal for reliable data communication.

Specifically, the scanner 100 in the remote unit 20b causes the transceiver 84 to scan a plurality of control channels that are stored in a control-channel-database in memory 96. For each control channel, the transceiver 84 measures the received-signal-strength and provides a receive signal strength indicating ("RSSI") signal to the controller 94. The controller 94 selects the control channel having the strongest signal and then uses a voice-channel database also stored in memory 96 to identify all voice channels associated with the identified control channel, and, thus, associated with the voice and data basestations 16, 36 of the cell 18 that is associated with the identified control channel.

Preferably, the voice channel database is a listing of specific "data-allocated channels" that have been allocated for data communication by the cellular telephone system 10 to the data basestations 36. Thus, the voice-channel database is a look-up table that identifies the data-allocated channels for use by the remote unit 20b.

This look-up table can be either static or, preferably, dynamic, with updates furnished from time to time by the data basestation 36. When dynamic, the data-allocated channels identified in the look-up table can be reduced in number so as to be only those channels which are not then, at the time of the up-dates, as indicated by the voice-channel-utilization signals, being used for voice communication. Methods for providing the up-dates will be described shortly.

In blocks 106, 108, the remote unit 20b determines which of the data-allocated channels identified in the stored voice channel database are available, at that time, for data communication. Specifically, in block 106, the remote unit 20b tests whether a first of the data-allocated channels carries an "available-channel signature."

Preferably, the available-channel signature is a special digital signal generated by the modem 56 in response to commands from the CPU 58, and broadcasted by the data basestation 36 on any data-allocated channel which is not at that time being used for voice or data communication.

As shown in FIG. 4a, the available-channel signature can have a first field of digital data providing identification information that will be recognized by the controller 94 as indicating that this particular signal is an available-channel signature, thus indicating that the channel over which it is being sent is available for data transmission. Preferably, and as shown, the available-channel signal also has a second field of digital data providing the voice-channel-database-update information that was mentioned above.

(Alternatively, the update information for the voice-channel database need not be contained in the available-channel signal, but, rather, can be furnished by separate update signals sent by the data basestation 36, e.g., periodically or whenever a change is to be made to the voice channel database.)

Returning to FIG. 3, if the first data-allocated channel does not carry an available-channel signature, then, in block 108, then the remote unit 20b switches to a next data-allocated channel, and repeats the "detect signature" test of block 106. This process continues until a channel carrying the signature is identified, in which case the transceiver 84 has been tuned to a voice channel available for data transmission.

Accordingly, in the preferred embodiment, the remote unit 20b itself selects an available data-allocated channel for data transmission without involving a hand-shake transaction (e.g., an exchange of control packets on a control channel) with potential basestations.

Subsequently, in block 110, the remote unit 20b sends a data packet over the identified, available data-allocated voice channel.

In block 112, the remote unit 20b tests whether, within a period T1 after the data packet has been transmitted, the transceiver 84 stops receiving the available-channel signature over the identified data allocation channel used for that data packet transmission. Normally, in response to receipt of a data packet from a remote unit 20b, as will be described below, the data basestation 36 disables the available-channel signal on that channel. Thus, this test provides a first indication of whether the data basestation 36 has in fact received the data packet. This is analogous to the "busy idle bit" routine specified in the above referenced EIA RS-553 standards.

If no loss of the available-channel signature is detected within the time T1, the remote unit 20b then returns to block 104 for channel selection. On the other hand, if a loss of the available-channel signature is detected within that period of time, the remote unit 20b next goes to block 114.

In block 114, the remote unit 20b checks whether the transceiver 84 has received an acknowledgement from the data basestation 36. Using acknowledgements to confirm receipt of data packets finds utility herein because, even though there has been a detected loss of the available-channel signature, that loss of signature may have resulted from receipt by the basestation 36 of a data packet from another remote unit 20b, and not from the one whose operation is being described herein. Accordingly, if the remote unit 20b receives an acknowledgement, then the data basestation 36 has in fact received the data packet broadcasted by the remote unit 20b, and the remote unit 20b next returns to block 104 for channel selection.

On the other hand, if no acknowledgement is received, then, in block 116, the remote unit 20b again checks whether a available-channel signature has been received from the data basestation within a time T2, thus indicating that the same voice channel can be used for further data transmission. If the signature is not detected, then the remote unit 20b returns to block 104, and channel selection is repeated.

On the other hand, if the signature is detected within T2, then in block 118, the remote unit 20b resends the data packet and, in block 122, increments a count to indicate that the data packet has been resent. After incrementing the count, the remote unit 20b then, in block 124, tests whether the count is greater than a preselected number, N1. If the count variable is not greater than the N1 limit, then the remote unit 20b rechecks for loss of signature in block 112, as indicated by the circled "B" in the drawing. However, if the count variable is greater than the N1 limit, then the remote unit 20b repeats the channel selection step at block 104.

In certain applications, acknowledgements of transmissions are not required and the acknowledgement steps just described can be omitted, in which case, after sending the data packet in block 110, the remote unit 20b returns to block 104.

FIG. 4 depicts data basestation operation during remote-to-base transmission. As represented by block 132, the data basestation 36 initially performs, e.g., self-diagnostic tests. Then, in block 134, the basestation 36 checks whether a first of the data-allocated channels is being used for data or voice communication. The data-allocated voice channels are identified in a data-allocated voice channel look-up table maintained in memory 74.

More specifically, the CPU 58 determines whether the data basestation 36 is itself using the voice channel for data communication, and determines whether the basestation 36 has received a voice-channel-utilization signal indicating that the voice channel is being used by the voice basestation 16 for voice communication.

If that channel is being so used, then, in block 136, the data basestation 36 switches to a next of the data-allocated voice channels and repeats the test of block 134 for the next channel.

On the other hand, if the data basestation 36 determines that the data-allocated voice channel is, not being used at that time for either voice or data transmission, the basestation 36 next, in block 138, enables an available-channel signature indicating that channel as available for data communication. More specifically, the CPU 58 causes the transceiver 54 to broadcast, e.g., the special digital signal on that data-allocated channel to identify that channel as being available for data transmission.

Further in block 138, the data basestation initializes and starts a data channel use timer 72a, which is shown in FIG. 2a as a part of the processor 72. The timer 72a responds to timing signals from the clock 76, and measures the total duration of the use of the channel for data transmission. The purpose of the timer 72a will be described below.

The data basestation 36 next, in block 142, checks whether the transceiver 54 has received a packet from any remote unit 20b. If no packet has been received, the data basestation 36 waits until a data packet is received by continuously performing the test of block 142. On receipt of a data packet, in block 144, the data basestation 36 disables the available-channel signature, i.e., stops broadcasting the signature, as mentioned hereinabove during the description of remote unit operation.

In block 146, the data basestation 36 sends an acknowledgement of receipt of the data packet.

After receiving the data packet, the data basestation 36 determines whether the data packet is a duplicate of one that was earlier received. This test is performed in block 148. If the packet is a duplicate, the data basestation 36 ignores the duplicate packet per block 152. On the other hand, if the data packet is not a duplicate, then, in block 154, the data basestation 36 sends the packet to the data switching system 46 for routing to its destination.

In either case, the data basestation 36 next, in block 156, once again enables the available-channel signature, and then the above-described procedure is repeated, as indicated by the circled "C" in the drawing, starting with block 142.

As explained above, the cellular telephone system 10 provides data services in such a way as to assuredly not interfere with voice services. To that end, the data basestation 36 takes certain measures during remote-to-base transmission to prevent such interference by appropriately controlling data service. These measures will be described next.

After the data basestation enable the signature and starts the data channel use timer in block 138, in addition to the test performed in block 142, the data basestation 36 performs parallel tests in block 162 and 164. Based on the outcomes of these tests, the CPU 58 causes the basestation 36 to step through the operations of the blocks 142 through 156 as just described, or terminates, at any time, the operations of those blocks.

In block 162, the data basestation 36 continuously tests whether the voice channel is being used for voice communication. The initiation of voice communication is determined by the data basestation 36 through the use of scanner 62 and CPU 58 respectively obtaining and recognizing a signal (described hereinabove as the voice channel utilization signal) from the voice basestation 16, which indicates that voice communication has begun.

On initiation of voice communication, the data basestation 36 immediately, as indicated in block 166, disables the available-channel signature, stops sending any acknowledgement that is being sent in block 146, and turns off the transmitter 54 so that not even the carrier is being sent. Afterwards, as indicated by the circled "D" in the drawing, the data basestation 36 switches to the next channel at block 136. On the other hand, as mentioned above, if the test of block 162 is negative, the test is repeated successively until such time as a voice channel utilization is detected.

In block 164, the data basestation 36 checks whether the data channel use timer indicates a duration greater than or equal to a preselected time, designated T3. It should be apparent from the above description that the data channel use timer 72a measures the total duration of use of a particular data channel from the time that the available-channel signature is enabled in block 138.

If that time exceeds the maximum duration T3, then the data basestation 36 proceeds to block 166, where the signature is disabled, and transmission of the acknowledgment is stopped, both as described above. On the other hand, if the channel-use-time variable has not reached the T3 limit, the test of 164 is successively performed.

Accordingly, the data basestation 36 controls data service during remote-to-base communication to assure that the transmission of data packets over voice channels does not interfere with voice services.

Base-to-Remote Data Transmission

Figure 5:
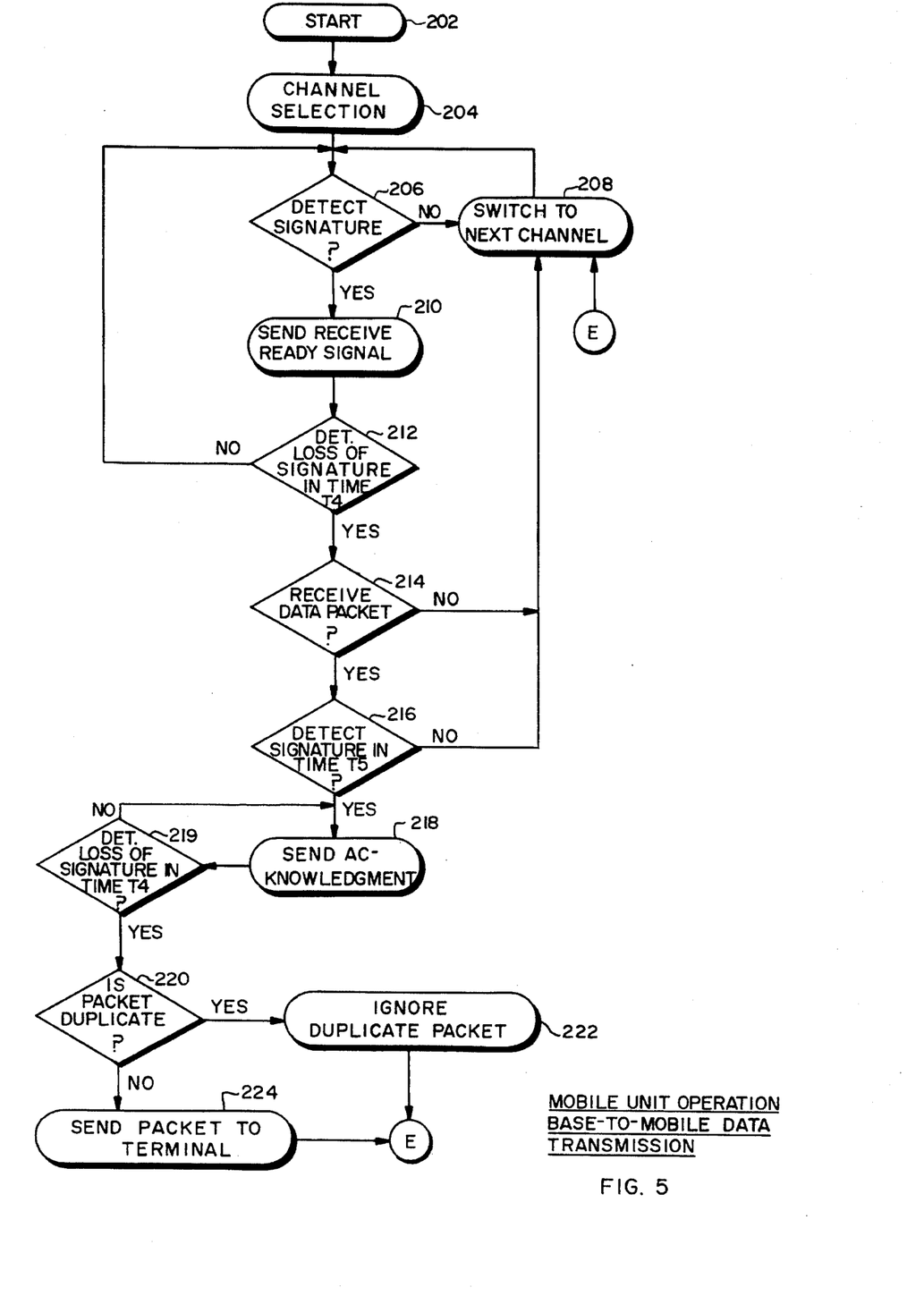
FIGS. 5 and 6 are flowcharts depicting the respective operation of the data remote unit and the data basestation shown in FIG. 2 during basestation-to-remote-unit transmission of data packets.
Figure 6:
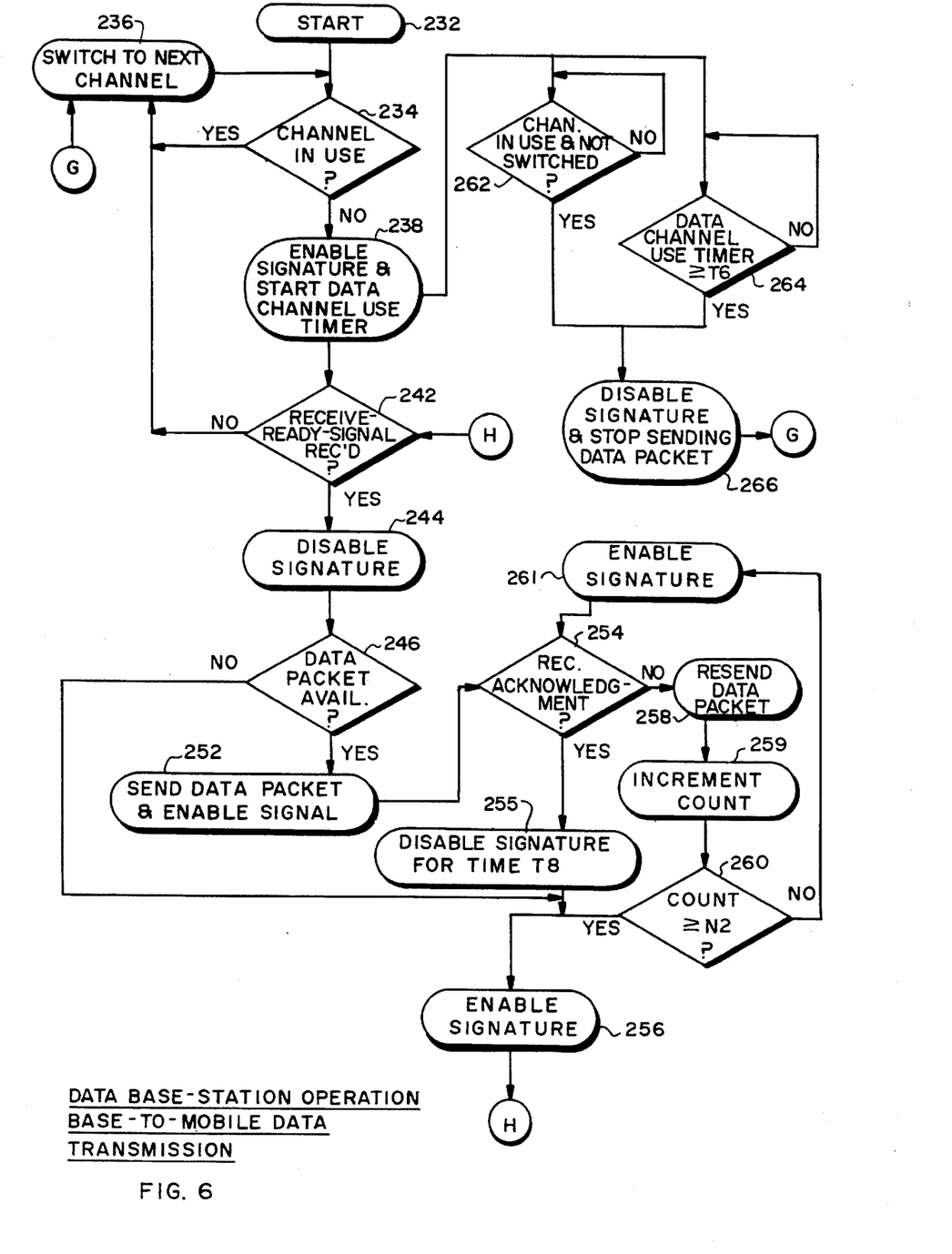

FIGS. 5 and 6 show respective data remote unit and data basestation operation during base-to-remote transmission of data in accordance with an illustrative embodiment of the invention. In FIG. 5, in start block 202, the remote unit 20b performs, e.g., self-diagnostic tests. Then, for data communication, in block 204, the remote unit 20b performs channel selection in the same manner as described above with respect to block 104 of FIG. 3.

Subsequently, in blocks 206 and 208, the data remote unit 20b determines which of the identified data-allocated channels is available for data communication by testing for available-channel signatures, as described above with respect to blocks 106 and 108 of FIG. 3.

In block 210, the data remote unit 20b sends a RECEIVE-READY signal over the identified, available voice channel. The RECEIVE-READY signal indicates that the data remote unit 20b is ready to receive data from the data basestation 36, and designates to the data basestation 36 that the channel over which it receives the RECEIVE-READY signal should be used for sending data to the remote unit 20b.

Accordingly, in the preferred embodiment, the remote unit 20b selects the voice channel to be used for data communication not only for remote-to-base transmission, but also for base-to-remote transmission.

Subsequently, in block 212, the re, mote unit 20b tests whether, within a period T4 after sending the RECEIVE-READY signal, the transceiver 84 stops receiving the available-channel signature over the voice channel on which the remote unit 20b had sent the RECEIVE-READY signal. As before with respect to block 112 of FIG. 3, this test provides an indication of whether the data basestation 36 has received the transmitted data, which this time is the RECEIVE-READY signal, since the data basestation 36 disables the signature on receipt of the data, as will be described below. If no loss of the signature is detected, then the remote unit 20b returns to block 206 to resend the RECEIVE-READY signal.

However, if a loss of the signature is detected, then, in block 214, the remote unit 20b checks whether the transceiver 84 has received a data packet from the basestation 36. If no packet is received, the remote unit 20b returns to block 208 and switches to the next channel.

On the other hand, if a data packet is received by the transceiver 84, then, in block 216, the remote unit 20b starts the receipt acknowledgment process by detecting whether the available-channel signature reappears within a preselected time T5 on the voice channel over which the data packet was received. If no signature is detected, the acknowledgment cannot be sent over that voice channel, the remote unit 20b returns to block 208 and switches to the next channel, and repeats the procedures just described.

If the signature is detected, then, in block 218, the remote unit 20b sends an acknowledgment to the data basestation 36 to acknowledge receipt of the data packet. As above, loss of the signature is detected in block 219 to indicate receipt of the acknowledgement by the basestation 36. If the signature disappears within time T4, then the remote unit 20b goes to block 220. Otherwise, the acknowledgment is resent at block 218.

(Preferably, block 219 also has a counter (not separately shown) to limit the number of times the acknowledgement is sent. Once that limit is met, the remote unit 20b returns to block 208 and switches to the next channel.)

Next, the remote unit 20b tests whether the received data packet is a duplicate in block 220, and either ignores the packet in block 222 if it is a duplicate, or else sends the non-duplicate packet in block 224 to the data terminal 88 (FIG. 2). This procedure of testing whether the data packet is a duplicate is analogous to that of blocks 148, 152, and 154 in FIG. 4. After either ignoring the packet as a duplicate, or sending the packet to the data terminal 88, the remote unit returns to block 208, switches to a next channel, and then repeats the "detect signature" test of block 206.

FIG. 6 depicts data basestation operation during base-to-remote transmission. As represented by block 232, the data basestation 36 initially performs, e.g., self-diagnostic tests. Then, in block 234, the basestation 36 checks whether a first of the data-allocated channels is being used for data or voice communication.

If that channel is being so used, then, in block 236, the data basestation 36 switches to a next of the data-allocated voice channels, and repeats the test of block 136 for the next channel.

On the other hand, if the data basestation 36 determines that the data-allocated voice channel is not being used at that time for either voice or data transmission, the basestation 36 next, in block 238, enables an available-channel signature indicating that channel as available for data communication.

Further in block 238, the data basestation initializes and starts a data channel use timer 72a, which is shown in FIG. 2a as a part of the processor 72.

The procedures of blocks 234 through 238 are analogous to those described for blocks 134 through 138 of FIG. 4. Accordingly, a further description of the operation of the basestation 36 in blocks 234 through 238 can be had by reference to the relevant paragraphs above.

The data basestation 36 next, in block 242, checks whether the transceivers 54 have received a RECEIVE-READY signal from any remote unit 20b. If no such signal has been received, the data basestation 36 waits until a RECEIVE-READY signal is received by continuously performing the test of block 42. On receipt of a data packet, in block 244, the data basestation 36 disables the available-channel signature, i.e., stops broadcasting the signature, as mentioned hereinabove during the description of remote unit operation.

Subsequently, in block 246, the data basestation 36 checks whether a data packet to be sent to the remote unit 20b is available in memory 74 of CPU 58. If such a data packet is available, then, in block 252, the basestation 36 causes the transceiver 54 that is tuned to the voice channel over which the RECEIVE-READY signal was received to transmit the available data packet over that voice channel. Then, the signature is re-enabled.

Then, in block 254, the data basestation 36 tests whether it has received an acknowledgment from the remote unit 20b to which the data packet was sent, as described above with respect to blocks 216 and 218 of FIG. 5. If an acknowledgment has been received, then, in block 255, the basestation 36 disables the signature for time T7.

After block 255, or if no data packet is available per the test of block 246, then, in block 256, the basestation 36 once again enables the data-allocated signature over that voice channel, and, as indicated by the circled "H" in the drawing, returns to the "RECEIVE-READY SIGNAL" test of block 242. Thereafter, the above-identified procedure is repeated to permit the sending of any remaining, available data packets having the same remote unit 20b as their destination.

On the other hand, if no acknowledgment is received from the remote unit 20b to which the data packet was transmitted, then, in block 258, the basestation 36 resends the data packet. Thereafter, the basestation 36 increments a count in block 259, and tests whether the count has reached a preselected number, N2, in block 260. If it has, then the basestation 36 proceeds to block 256, at which the signature is enabled, as described above. Otherwise, if the count has not reached the N2 limit, the basestation 36 enables the signature in block 261, and then returns to block 254, at which it again checks whether an acknowledgment has been received.

As explained above, the cellular telephone system 10 provides data service in such a way as to assuredly not interfere with voice service. To that end, the data basestation 36 again takes certain measures during base-to-remote transmission to prevent such interference by appropriately controlling data service. These measures will be described next.

After the data basestation enables the signature and starts the data channel use timer in block 238, in addition to the test performed in block 242, the data basestation 36 performs parallel tests in block 262 and 264. Based on the outcomes of these tests, the CPU 58 causes the basestation 36 to step through the operations of blocks 242 through 260 or 261, as just described, or terminates, at any time, the operations of those blocks.

In block 262, the data basestation 36 continuously tests whether the voice channel is being used for voice communication. The initiation of voice communication is determined by the data basestation 36 through the use of scanner 62 and CPU 58 respectively obtaining and recognizing a signal (described hereinabove as the voice channel utilization signal) from the voice basestation 16, which indicates that voice communication has begun.

on initiation of voice communication, the data basestation 36 immediately, as indicated in block 266, disables the available-channel signature, stops sending any data packet that is in process of being sent in block 252 or 258, and turns off the transmitter 54. Afterwards, as indicated by the circled "G" in the drawing, the data basestation 36 switches to the next channel at block 236. On the other hand, as mentioned above, if the test of block 262 is negative, the test is repeated successively until such time as voice channel utilization is detected.

In block 264, the data basestation 36 checks whether the data channel use timer indicates a duration greater than or equal to a preselected time, designated T6. It should be apparent from the above description that the data channel use timer 72a measures the total duration of use of a particular data channel from the time that the available-channel signature is enabled in block 238.

If that time exceeds the maximum duration T6, then the data basestation 36 proceeds to block 266, where the signature is disabled, transmission of data packets is stopped, and the transmitter 54 is disabled so that no signal can be sent that might interfere with voice communication, all as described above. On the other hand, if the channel-use-time variable has not reached the T6 limit, the test of 264 is successively performed.

Accordingly, the data basestation 36 controls data service during both remote-to-base and base-to-remote communication to assure that the transmission of data packets over voice channels does not interfere with voice services.

Figure 7:
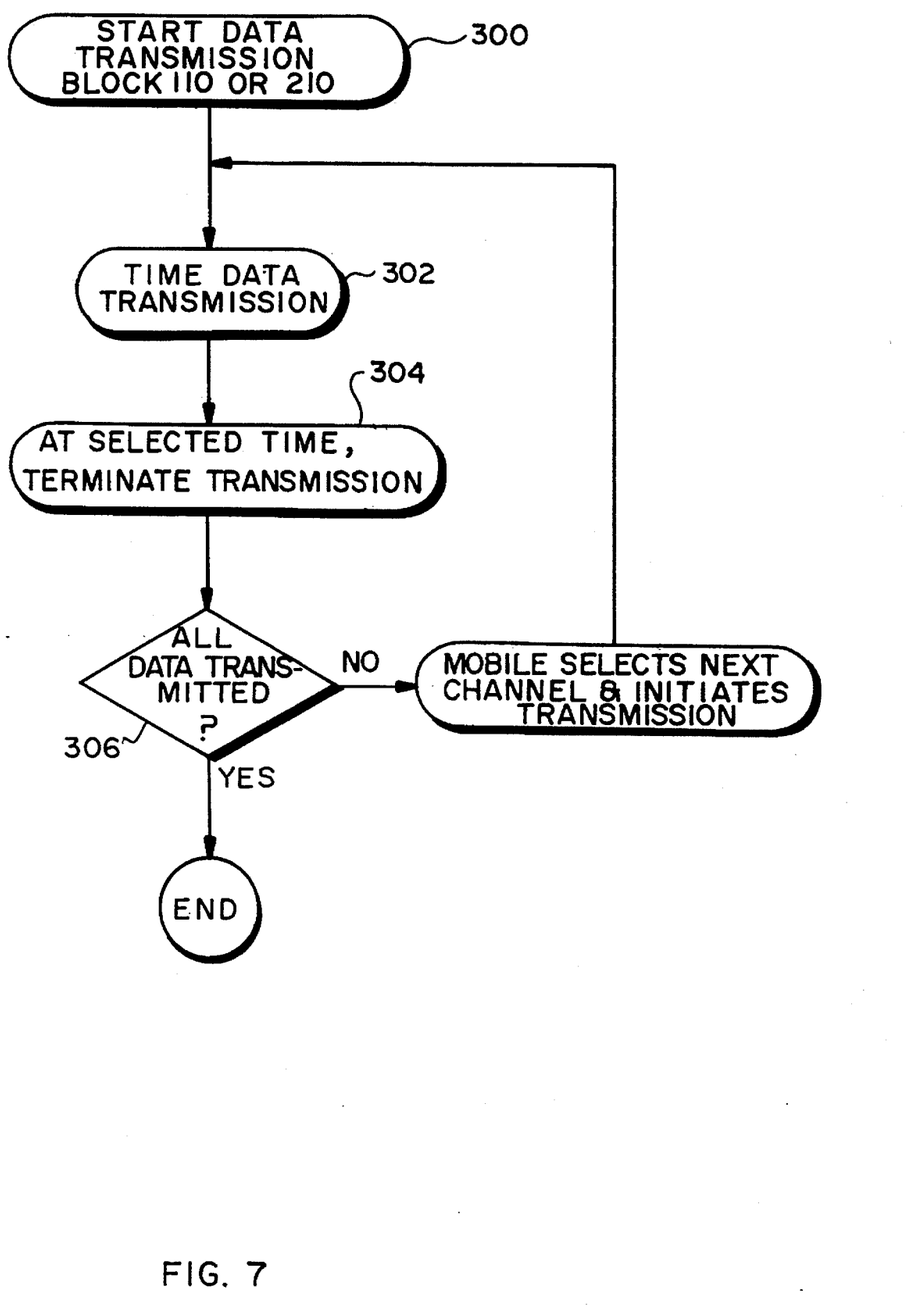
FIG. 7 is a flowchart depicting another, optional technique of assuring that data service does not interfere with voice service in the cellular telephone system of FIG. 1.

Another, optional technique of assuring that the data service will not interfere with voice service entails limiting data transmission on a voice channel by the remote unit 20b to a preselected maximum duration. In other words, the remote unit 20b times each data call, and terminated after a selected measured duration.

FIG. 7 illustrates this technique. In block 300 of that drawing, the remote unit 20b starts sending either a data packet in block 110 of FIG. 3 or a RECEIVE-READY signal in block 210 of FIG. 5, as described above, over an available data-allocated channel. Immediately upon starting transmission, the remote unit 20b, in block 302, starts a transmission timer. For this, the controller 94 has a clock or timing circuit 94a, as shown in FIG. 2.

In block 304, at the end of a preselected period of time, (i.e., when the timer 94a has reached a preselected duration, T7), the remote unit 20b terminates transmission on that voice channel.

Afterwards, in block 306, the remote unit 20b checks whether data transmission had been completed before T7 is reached and transmission terminated. If transmission had not been completed, then, in block 308, remote unit 20a selects a further available data-allocated voice channel, and repeats the data transmission. On the other hand, if transmission is completed within time T7, then this technique does not affect transmission.

The foregoing description of the data remote unit 20b applies as well to a remote unit 20c, shown in FIG. 1, which contains both the components of the voice remote unit 20a and those of the data remote unit 20b that are needed for voice and data communication. Thus, for data transmission over the cellular telephone system 10, either a data-only remote unit 20b or a hybrid, data and voice remote unit 20c can be used.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A cellular telephone system comprising:

A) a voice communication subsystem including at least one voice basestation for providing circuit-switched voice service over a plurality of voice channels; and B) a data communication subsystem including at least one data basestation for providing packet-switched data service over one or more of said voice channels;

C) wherein said voice basestation includes a voice basestation transceiver for transmitting control signals over at least one control channel and voice signals over said voice channels, said voice communication subsystem providing said circuit-switched voice service independently of the packet-switched data service provided by said data communication subsystem; and D) wherein said data communication subsystem includes basestation monitoring means for monitoring the use of voice channels by said voice communication subsystem, a data basestation transceiver for transmitting data signals over said voice channels, and data basestation processor means responsive to said monitoring means for controlling said data communication transceiver means to transmit data signals over a selected voice channel when said basestation monitoring means determines that said voice communication subsystem is not then transmitting over the selected voice channel, and to refrain from transmitting over the selected voice channel whenever said basestation monitoring means determines that said voice communication subsystem is transmitting over the selected voice channel.

2. The cellular telephone system in accordance with claim 1 wherein said basestation monitoring means identifies the voice channel or channels which are not being used for voice service, and said data communication subsystem provides data service on one or more of said voice channels identified by said basestation monitoring means.

3. The cellular telephone system in accordance with claim 2, wherein said basestation monitoring means includes means for scanning power levels of signals produced by said voice communication subsystem over said voice channels, said basestation monitoring means determining a voice channel is not in use when the power levels of the signals on the channel are below a predetermined threshold.

4. A cellular telephone system comprising:

A) a circuit-switched communication subsystem for providing circuit-switched communication service over a plurality of radio-frequency channels; and B) a data communication subsystem for providing packet-switched data communication service over one or more of said radio-frequency channels;

C) said circuit-switched communication subsystem
 i) using at least one control channel in association with said circuit-switched communication service; and
 ii) providing said circuit-switched communication service independently of the packet-switched data communication data service of said data communication subsystem; and D) said data communication subsystem including monitoring means for monitoring the circuit-switched communication service of said circuit-switched communication subsystem, and processor means for, in response thereto, controlling said packet-switched communication data service, to provide packet-switched communication data service over a selected channel which is not in use by said circuit-switched communications subsystem and to refrain from providing packet-switched communication data over said selected channel whenever said channel is in use by said circuit-switched communication subsystem.

5. The cellular telephone system in accordance with claim 4, wherein said data communication subsystem monitors use of said radio-frequency channels by said circuit-switched communication subsystem to identify the radio-frequency channel or channels which are not being used for circuit-switched service, and, in response thereto, allocates one or more of said identified radio-frequency channels for said data service.

6. The cellular telephone system in accordance with claim 5, wherein said data communication subsystem identifies radio-frequency channels not being used for circuit-switched service by monitoring power levels of signals produced by said circuit-switched communication subsystem.

7. The cellular telephone system in accordance with claim 1, wherein said data communication subsystem includes a least one data basestation, said data basestation transmitting, from time to time, an available-channel signature to identify those, if any, of the radio-frequency channels that are not then being used in circuit-switched communication service.

* * * * *